(12) United States Patent
Weber et al.

(10) Patent No.: US 7,636,625 B2
(45) Date of Patent: Dec. 22, 2009

(54) DEVICE FOR CLASSIFYING AT LEAST ONE OBJECT WITH THE AID OF AN ENVIRONMENTAL SENSOR SYSTEM

(75) Inventors: Dirk Weber, Stuttgart (DE); Alfred Kuttenberger, Nulringen (DE); Marc Theisen, Besigheim (DE); Michael Bunse, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 58 days.

(21) Appl. No.: 10/541,207

(22) PCT Filed: Mar. 25, 2004

(86) PCT No.: PCT/DE2004/000615

§ 371 (c)(1),
(2), (4) Date: Jul. 1, 2005

(87) PCT Pub. No.: WO2004/110813

PCT Pub. Date: Dec. 23, 2004

(65) Prior Publication Data

US 2006/0050148 A1     Mar. 9, 2006

(30) Foreign Application Priority Data

May 28, 2003   (DE) ................ 103 24 217

(51) Int. Cl.
| | | |
|---|---|---|
| B60R 21/013 | (2006.01) | |
| B60R 21/00 | (2006.01) | |
| B60T 7/12 | (2006.01) | |
| G06F 7/00 | (2006.01) | |
| G06F 17/00 | (2006.01) | |

(52) U.S. Cl. ................ 701/45; 701/300; 180/167; 180/271; 340/435

(58) Field of Classification Search ............. 701/45, 701/1, 36, 65, 70, 79, 93, 96, 300, 301, 200; 180/167, 169, 271, 282; 340/425.5, 435, 340/436; 280/734, 735

See application file for complete search history.

(56) References Cited

U.S. PATENT DOCUMENTS

| | | | |
|---|---|---|---|
| 6,434,461 | B1 | 8/2002 | Jacob et al. |
| 6,825,455 | B1 | 11/2004 | Schwarte |
| 7,049,945 | B2 * | 5/2006 | Breed et al. ............ 340/435 |
| 2002/0005778 | A1 * | 1/2002 | Breed et al. ............ 340/435 |
| 2002/0185324 | A1 | 12/2002 | Campbell et al. |
| 2004/0019420 | A1 * | 1/2004 | Rao et al. ............. 701/45 |
| 2004/0117116 | A1 * | 6/2004 | Rao et al. ............. 701/301 |
| 2004/0153244 | A1 * | 8/2004 | Kellum ............... 701/301 |

FOREIGN PATENT DOCUMENTS

| | | |
|---|---|---|
| DE | 197 04 496 | 3/1998 |
| DE | 198 03 068 | 7/1999 |
| DE | 100 25 678 | 12/2001 |
| DE | 101 16 277 | 10/2002 |

(Continued)

*Primary Examiner*—Edward Pipala
(74) *Attorney, Agent, or Firm*—Kenyon & Kenyon LLP

(57) ABSTRACT

A device for classifying at least one object with the aid of an environmental sensor system. The device classifies the at least one object on the basis of its velocity and acceleration, the device determining the velocity and the acceleration from a signal of the environmental sensor system.

28 Claims, 1 Drawing Sheet

FOREIGN PATENT DOCUMENTS

| | | |
|---|---|---|
| JP | 10067301 | 3/1998 |
| JP | 2000-517427 | 12/2000 |
| JP | 2002-501853 | 1/2002 |
| JP | 2002-059796 | 2/2002 |
| JP | 2003-085698 | 3/2003 |

* cited by examiner

DEVICE FOR CLASSIFYING AT LEAST ONE OBJECT WITH THE AID OF AN ENVIRONMENTAL SENSOR SYSTEM

BACKGROUND INFORMATION

The present invention relates to a device for classifying at least one object with the aid of an environmental sensor system.

A camera-based precrash detection system is known from DE 100 25 678 A1. In this context, collision counterparts are classified with the intention of providing reliable standardization. The classification is carried out on the basis of the relative velocity of these objects.

SUMMARY OF THE INVENTION

The device of the present invention for classifying at least one object has the advantage over the related art that the object is now classified on the basis of its velocity and the acceleration.

In particular, the acceleration information also allows objects to be classified more reliably. For example, a first discriminating criterion is the exclusion of objects securely anchored to the ground, such as poles and walls, when the object to be classified can be assigned a velocity other than zero. If desired, the position of the object (e.g. on the roadway, next to the roadway) may be used to check the plausibility of the classification. Different classes of objects (such as, on one hand, vehicles and, on the other hand, pedestrians) may also be distinguished on the basis of their movement patterns, i.e. the specific velocity and acceleration characteristic.

It is at least possible to divide the objects into static and moving or accelerating objects. When assigning a crash object to the class of moving objects, this classification may be used for controlling restraint systems in a more precise manner.

BRIEF DESCRIPTION OF THE DRAWING

Exemplary embodiments, of the present invention are shown in the drawing and are explained in detail in the following description.

DETAILED DESCRIPTION OF THE INVENTION

Figure 1:
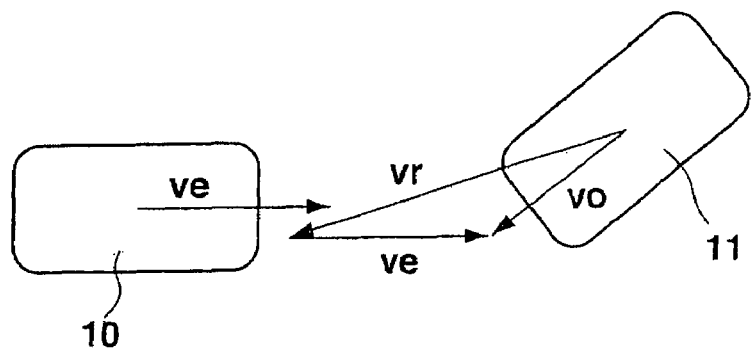
FIG. 1 shows a typical scene of a vehicle and an object.

It is particularly advantageous that the acceleration of the object is determined as a function of the reference acceleration of the observer. However, the acceleration may also or additionally be determined from the time characteristic of the reference velocity and the object velocity. In this context, the reference velocity means the velocity of the observer, i.e. that of the reference vehicle which is equipped with the classification device. This reference velocity may be determined, for example, on the basis of wheel velocities, the ABS system, or the tachometer. The object velocity is the velocity of the object. As an alternative, the velocity may also be determined on the basis of a curve of location information versus time.

In addition to or instead of a radar, ultrasonic, and/or video sensor system, the environmental sensor system may also have a photonic mixer device and/or a LIDAR system, where, in addition to the conventional radar system that uses microwaves, the LIDAR system uses laser.

The environmental sensor system may advantageously have a photonic mixer device, as well. In this context, the so-called time-of-flight measurement is used, which allows distance information in the image plane of an imaging system. At this point, reference is made to DE 197 04 496 A1, which describes such a photonic mixer device.

As a function of the classification, the driver may also be informed when, for example, a critical situation involving a high accident risk is present. This information may occur optically, acoustically, and/or haptically. In particular, the tightening of the reversible seatbelt tensioner is used as haptic information.

Finally, it is also advantageous that a restraint system is controlled as a function of this classification. This is particularly advantageous for the control of reversible restraining devices, as well.

With the aid of suitable sensor technology, such as radar, ultrasonic, LIDAR, or video technology, it is possible to measure distances and relative velocities between objects and the radar sensor. In this connection, such information regarding the impact time and velocity may be ascertained in precrash systems, in order to control restraining devices. In certain measuring systems, such as the radar system, which only use the distance information and do not provide three-dimensional spatial resolution, it is not possible to classify objects, since, for example, only the total radar cross-section is available as a property characteristic of the object.

According to the present invention, an object is now classified on the basis of its velocity characteristic. This means that the characteristic curve of the velocity is determined from the velocity of the object and its acceleration. Both parameters, the velocity and the acceleration, define the object, which means that restraining devices may then be precisely controlled as a function of the classification.

The measuring system determines the relative velocity between the crash object and the reference vehicle. The velocity of the object may be calculated from this relative velocity and the available velocity of the reference vehicle, which may be evaluated, e.g. via CAN. Then, the acceleration of the object may also be estimated from the history of the two data and the brake condition of the reference vehicle. Using the velocity and the acceleration of the object, a classification is undertaken by an object-classification algorithm. If an object belongs to the class of moving and accelerating objects, this information may be used in the algorithm for controlling restraint systems, since it is highly probable that the object is not a pole or a rigid wall. The restraint systems may then be controlled in the algorithm in accordance with the object class and further crash parameters, e.g. acceleration signals and the relative velocity.

FIG. 1 shows such a scene, in which the device of the present invention is used. Reference vehicle 10 has a reference velocity VE, while an object 11, a vehicle monitored by the precrash sensor system of vehicle 10, has velocity VO. Relative velocity VR results from the vectorial subtraction of reference velocity VE and velocity VO. Velocity VR may be ascertained by a precrash sensor system. The accelerating behavior of vehicle 11 may be determined, for example, from the time characteristic of relative velocity VR. Velocity VO, which is determined using relative velocity VR and reference velocity VE, and the acceleration of vehicle 11, result in a classification of vehicle 11. Reference velocity VE is ascertained, for example, via the wheel velocities.

Figure 2:
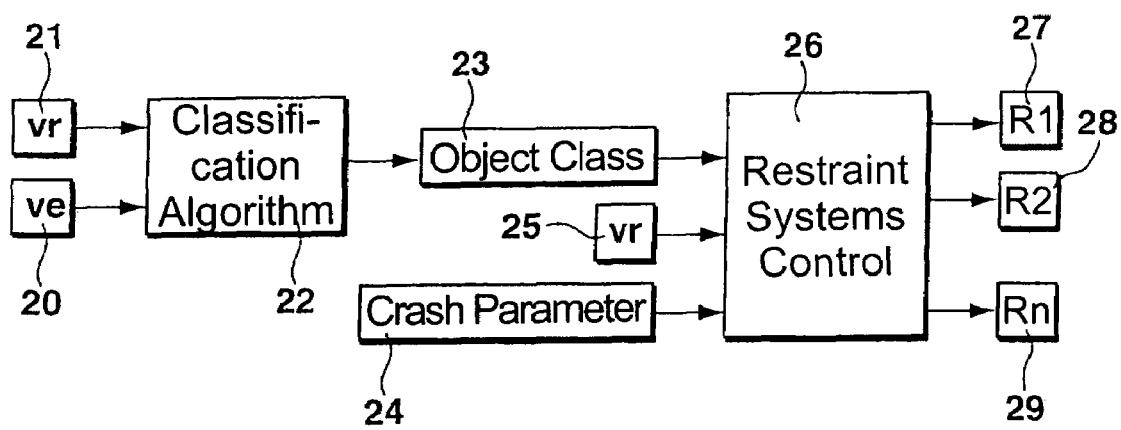
FIG. 2 shows a block diagram of the device according to the present invention.

FIG. 2 clarifies the device of the present invention, using a block diagram. In block 21, relative velocity VR is ascertained by a precrash sensor system. In block 20, reference velocity VE is determined as shown above, e.g. using the wheel velocities and/or a tachometer. A classification algorithm 22, which is computed on a processor of the control unit, e.g. the airbag control unit, determines the object velocity and its acceleration from the time characteristic of velocities VR and VE. Algorithm 22 classifies vehicle 11 from these velocities and the acceleration. It then assigns, to object 11, predefined object classes 23 which are defined by velocity VO and the acceleration. In block 26, the restraining devices are triggered as a function of relative velocity 25 and further crash parameters, such as the decelerations that are generated in block 24. In this case, the restraining devices may be, e.g. restraining devices R1 a seat-belt tensioner 27, R2 a front airbag 28, and RN a front-passenger-side airbag 29.

Figure 3:
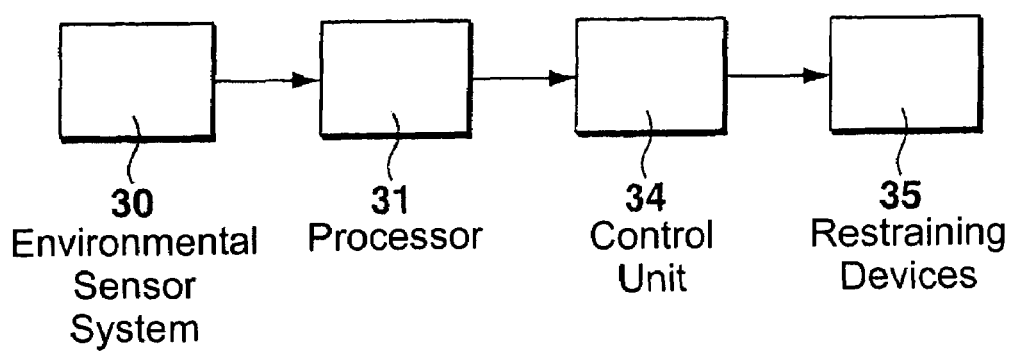
FIG. 3 shows another block diagram of the device according to the present invention.

FIG. 3 explains, in an additional block diagram, the individual components of the device according to the present invention. A precrash sensor system 30 determines relative velocity VR of object 11. In processor 31, which receives the signal of precrash sensor system 30, velocity VO of object 11 is then determined from the signal, using the reference velocity of the vehicle on which precrash sensor system 30 is located. Reference velocity VE is ascertained, e.g. using a wheel-velocity measurement or the tachometer. This information is contained, for example, on the CAN bus. The acceleration behavior of object 11 is determined from the time characteristic of velocity VO and velocity VE. The object classification is obtained from this, i.e. the class of the object is determined by the acceleration and velocity VO. This object class is then transmitted to a control unit 34 for restraint systems. As a function of the object class and these further parameters, control unit 34, which is connected to other vehicle components and sensors via connections not shown here, determines the activation of restraining devices 35, which include airbags, seat-belt tensioners, and roll bars.

What is claimed is:

1. A device for classifying at least one object with the aid of an environmental sensor system of a vehicle, comprising:
   a classifying arrangement to classify the at least one object based on its object velocity and object acceleration; and
   a determining arrangement to determine the object velocity and the object acceleration from at least one signal of the environmental sensor system;
   wherein the device is adapted to be coupled to a restraint system and is capable of controlling the restraint system as a function of the classification of the at least one object and a relative velocity of the at least one object relative to the vehicle, and
   wherein the device classifies the at least one object into one of: a first object class or a second object class, the first object class being a vehicle object class and the second object class being a pedestrian object class.

2. The device as recited in claim 1, wherein the object acceleration is determined based on at least one reference acceleration.

3. The device as recited in claim 1, wherein the object acceleration is determined based on a time characteristic of a reference velocity and of the object velocity.

4. The device as recited in claim 1, wherein the object velocity is determined with the aid of a relative velocity.

5. The device as recited in claim 1, wherein the object velocity is determined on the basis of a time characteristic of location information.

6. The device as recited in claim 1, wherein the environmental sensor system has at least one photonic mixer device.

7. The device as recited in claim 1, wherein the environmental sensor system has a LIDAR system.

8. The device as recited in claim 1, wherein the device is configured for outputting information to the driver, the output taking place as a function of the classification.

9. The device as recited in claim 8, wherein the information is outputted haptically.

10. The device of claim 1, wherein the controlling of the restraint system is also as a function of at least one additional crash parameter.

11. The device of claim 1, wherein the device is configured to, after the classification of the at least one object has been performed, test the accuracy of the classification using a position of the at least one object.

12. The device of claim 11, wherein the position of the at least one object can have a first value and a second value, the first value indicating that the at least one object is on the roadway, the second value indicating that the at least one object is next to the roadway.

13. The device of claim 1, wherein the device is configured to control the restraint system in a different manner for different object classifications.

14. The device of claim 1, wherein the device is configured to not classify objects having a substantially zero object velocity.

15. The device of claim 3, wherein the device is configured to determine the reference velocity based on at least one of: a wheel velocity, an anti-lock braking (ABS) system, or a tachometer.

16. The device of claim 4, wherein the device is configured to determine the object velocity also based on a reference velocity, and the device is configured to receive the reference velocity from a controller area network (CAN).

17. The device of claim 1, wherein the object velocity is determined based on a relative velocity of the at least one object relative to the vehicle, a reference velocity of the vehicle, and a braking status of the vehicle.

18. The device of claim 1, wherein the object acceleration is determined based on a time characteristic of a reference velocity and of the object velocity, wherein the object velocity is determined based on at least one of a relative velocity and a time characteristic of location information, wherein information is output to the driver as a function of the classification, wherein the object velocity is determined based on the relative velocity of the at least one object relative to the vehicle, a reference velocity of the vehicle, and a braking status of the vehicle, and wherein the reference velocity is determined based on at least one of a wheel velocity, an anti-lock braking (ABS) system, or a tachometer.

19. The device of claim 18, wherein after the classification of the at least one object has been performed, the accuracy of the classification is tested using a position of the at least one object, wherein the position of the at least one object can have a first value and a second value, the first value indicating that the at least one object is on the roadway, the second value indicating that the at least one object is next to the roadway, wherein the restraint system is controlled differently for different object classifications, and wherein objects having a substantially zero object velocity are not classified.

20. The device of claim 19, wherein the environmental sensor system has a LIDAR system, wherein the information is outputted haptically, and wherein the controlling of the restraint system is also as a function of at least one additional crash parameter.

21. The device of claim 1, wherein objects having a velocity of zero are classified so as to be excluded, and wherein a plausibility of the classification of the excluded objects is confirmed based on a static position of the excluded objects.

22. The device of claim 1, wherein moving and pedestrians are classified based on their movement patterns, including their specific velocity and acceleration characteristics, wherein objects having a velocity of zero are classified so as to be excluded, and wherein a plausibility of the classification of the excluded objects is confirmed based on a static position of the excluded objects.

23. A method for classifying at least one object with the aid of an environmental sensor system of a vehicle, the method comprising:
   classifying the at least one object based on an object velocity and an object acceleration of the at least one object, wherein the classifying classifies the at least one object into one of: a first object class or a second object class, the first object class being a vehicle object class and the second object class being a pedestrian object class;
   determining the object velocity and the object acceleration from at least one signal of the environmental sensor system; and
   controlling a restraint system as a function of the classification of the at least one object and a relative velocity of the at least one object relative to the vehicle;
   wherein the device classifies the at least one object into one of: the first object class, the second object class or a third object class, the third object class being a securely-anchored object class.

24. The method of claim 23, wherein the object acceleration is determined based on a time characteristic of a reference velocity and of the object velocity, wherein the object velocity is determined based on at least one of a relative velocity and a time characteristic of location information, wherein information is output to the driver as a function of the classification, wherein the object velocity is determined based on the relative velocity of the at least one object relative to the vehicle, a reference velocity of the vehicle, and a braking status of the vehicle, and wherein the reference velocity is determined based on at least one of a wheel velocity, an anti-lock braking (ABS) system, or a tachometer.

25. The method of claim 24, further comprising:
   testing, after the classification of the at least one object has been performed, the accuracy of the classification using a position of the at least one object;
   wherein the position of the at least one object can have a first value and a second value, the first value indicating that the at least one object is on the roadway, the second value indicating that the at least one object is next to the roadway, wherein the device is configured to control the restraint system in a different manner for different object classifications, wherein objects having a substantially zero object velocity are not classified.

26. The method of claim 25, wherein the environmental sensor system has a LIDAR system, wherein the information is outputted haptically, and wherein the controlling of the restraint system is also as a function of at least one additional crash parameter.

27. The method of claim 23, wherein objects having a velocity of zero are classified so as to be excluded, and wherein a plausibility of the classification of the excluded objects is confirmed based on a static position of the excluded objects.

28. The device of claim 23, wherein moving and pedestrians are classified based on their movement patterns, including their specific velocity and acceleration characteristics, wherein objects having a velocity of zero are classified so as to be excluded, and wherein a plausibility of the classification of the excluded objects is confirmed based on a static position of the excluded objects.

* * * * *